United States Patent [19]

Hurley

[11] 4,294,133

[45] Oct. 13, 1981

[54] BOWDEN CABLE RETAINER AND ADJUSTER

[75] Inventor: John J. Hurley, Livonia, Mich.

[73] Assignee: Ford Motor Company, Dearborn, Mich.

[21] Appl. No.: 78,130

[22] Filed: Sep. 24, 1979

[51] Int. Cl.³ .............................................. F16C 1/06
[52] U.S. Cl. ........................................ 74/501 P; 64/3;
74/501 R; 24/260
[58] Field of Search ...................... 64/3, 2 R, 4, 32 R;
74/12, 501 R, 501 P; 24/260, 258

[56] References Cited

U.S. PATENT DOCUMENTS

| | | | |
|---|---|---|---|
| 3,139,768 | 7/1964 | Biesecker | 74/501 R |
| 3,366,405 | 1/1968 | Sevrence | 74/501 P |
| 3,393,578 | 7/1968 | Tschanz | 64/3 |
| 3,572,159 | 3/1971 | Tschanz | 74/501 P |
| 3,587,341 | 6/1971 | Fiddler | 64/3 |
| 3,885,474 | 5/1975 | Horvath et al. | 64/3 |
| 4,023,435 | 5/1977 | Ladue | 74/501 P |
| 4,185,515 | 1/1980 | Webb | 74/501 P |

Primary Examiner—Ira S. Lazarus
Assistant Examiner—Magdalen Moy
Attorney, Agent, or Firm—Peter Abolins; Clifford L. Sadler

[57] ABSTRACT

This specification discloses an adjustable connector assembly for securing and positioning a Bowden cable, such as that used in an automobile speed control linkage. The connector assembly includes an elongated, externally grooved sleeve on the Bowden cable and a two piece mounting assembly for clamping onto the grooved sleeve at a desired longitudinal position and coupling the Bowden cable to a support member.

9 Claims, 7 Drawing Figures

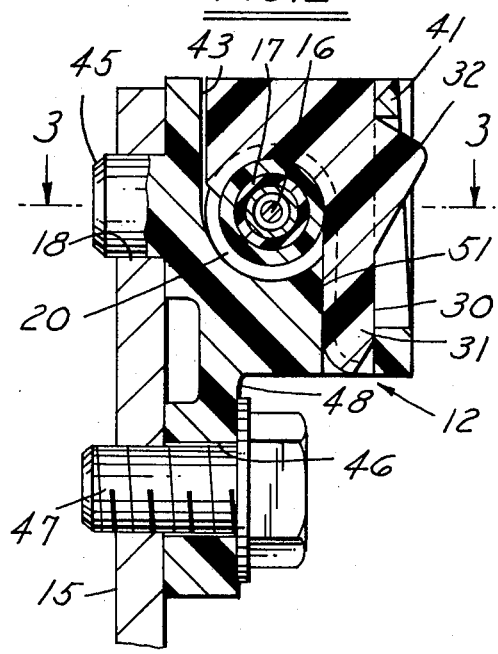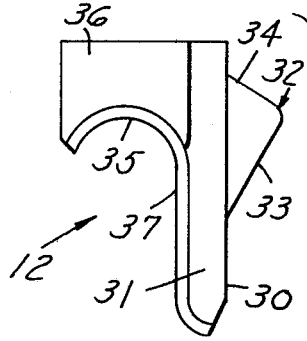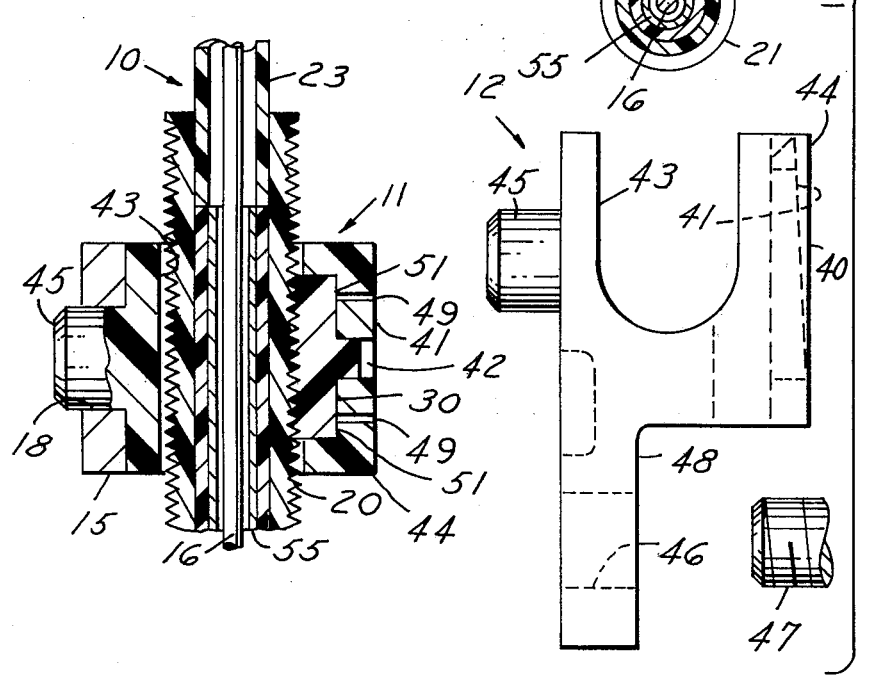

BOWDEN CABLE RETAINER AND ADJUSTER

BACKGROUND OF THE INVENTION

(1) Field of the Invention

This invention relates to the securing and positioning of a Bowden cable.

(2) Prior Art

As is known, a Bowden cable is a wire made of spring steel which is enclosed by helical lay wires and used to transmit longitudinal motions over distances, particularly around corners. Assembly and adjustment of a speed control device for maintaining a given speed of an automobile requires that during manufacture of the automobile and adjustment wire be quickly and accurately positioned to establish a predetermined setting. Various clamp means are known to secure a Bowden cable to another member. For example, a clamp having a semicircular grasping portion can fit over a portion of the outside of the Bowden cable. The clamp can have an extension with an opening for passing a screw to attach the clamp to a support member. Such a clamping method is undesirable because it depends on the frictional force between the clamp and the exterior of the Bowden cable to secure the longitudinal position of the Bowden cable. Any slippage between the Bowden cable and the clamp results in a misadjustment of the Bowden cable. Additionally, if the clamp is too tight, the function of the Bowden can be impaired because the internal wire is prevented from movement.

In another known clamp means, a nylon sleeve covering of the helical lay wires has a threaded portion. Two adjacent ring-like bracket pieces for mounting are each threaded over the end of the cable and then pressed together around the threads. A press fit secures the bracket pieces to each other and to the threaded portion. A drawback of this particular configuration is the need for threading or insertion of the bracket pieces over the end of the cable. Another disadvantage is the longitudinal movement of the mounting bracket with respect to the sleeve when the mounting bracket is turned on the threads of the sleeve. Not only would easier assembly be more desirable, but it would be desirable to eliminate longitudinal relative motion between the clamp and the cable. The ring-like bracket pieces also have a mounting configuration which constrains them to be positioned at the end of the Bowden cable.

Apart from the securing of a Bowden cable, longitudinal adjustment of the central wire of a Bowden cable has been attempted by the use of a bead chain. Thus, depending upon the position desired, a particular bead of the chain can be secured within a keyway as is well known. This approach is also undesirable because each bead increment provides a relatively large step in the adjustment length and because of the additional complexity of attaching the ball chain at the end of the central wire. These are some of the problems this invention overcomes.

SUMMARY OF THE INVENTION

In accordance with an embodiment of this invention, an adjustable connector assembly for securing and positioning a Bowden cable with respect to a support member includes a grooved sleeve means and a mounting assembly means. The grooved sleeve means is attached to the Bowden cable and is generally elongated along the axis of the Bowden cable and has circumferential grooves or serrations spaced along the Bowden cable axis.

The mounting assembly means attaches the grooved sleeve means and an adjuster means, for securing therebetween the grooved sleeve means. The clip means and the adjuster means include a first connector means and a second connector means, respectively, for releasably attaching the clip means to the adjuster means sufficiently snuggly so as to securely, longitudinally position the mounting assembly means with respect to the grooved sleeve means.

As a result of a construction in accordance with an embodiment of this invention, a Bowden cable can be easily and rapidly both secured and longitudinally positioned with respect to a support member. This facilitates assembly of a Bowden cable apparatus such as a speed control linkage for an automobile. Simpler assembly reduces cost. Further, by the elimination of extraneous components such as the ball chain, the number of components is reduced which also reduces cost. Still further, adjustment of the Bowden cable is not constrained to occur at either end of the cable and can be conveniently done where a support member is positioned.

BRIEF DESCRIPTION OF THE DRAWINGS

FIG. 2 is a section view taken along section line II—II of FIG. 1;

FIG. 3 is a section view taken along section line III—III of FIG. 2;

FIG. 4 is an exploded, partly section, view of a connector assembly in accordance with an embodiment of this invention;

DETAILED DESCRIPTION OF THE INVENTION

Figure 1:
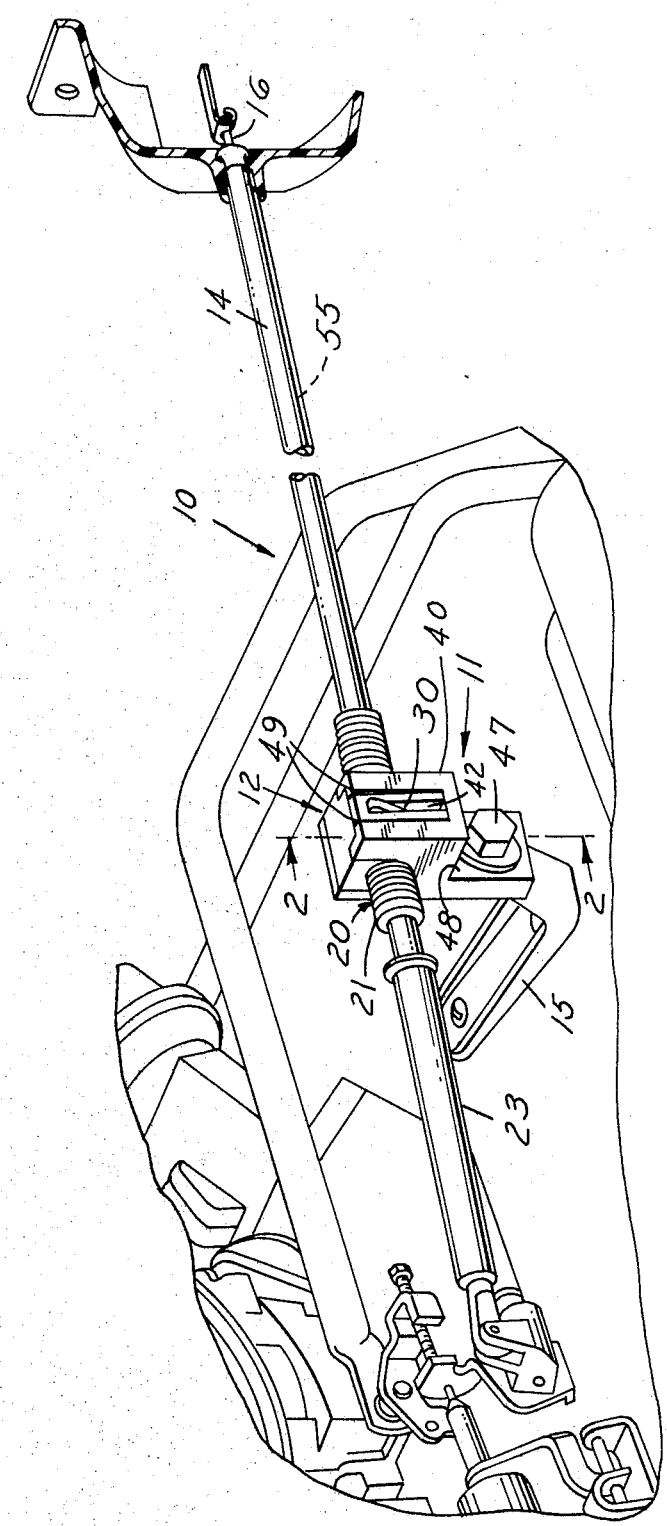
FIG. 1 is a perspective view of a speed control assembly mounted to an engine including an adjustable connector assembly in accordance with an embodiment of this invention.

Referring to FIGS. 1 and 2 Bowden cable 14 includes a spring steel wire 16 enclosed in a helical casing 17 so that spring steel wire 16 is relatively movable with respect to helical casing 17 and can transmit longitudinal motions over distances and particularly around corners. Bowden cable 14 for a speed control assembly is secured and adjusted by an adjustable connector assembly 11 including a grooved sleeve 20 attached to the exterior of Bowden cable 14. Grooved sleeve 20 is attached to a support member 15 by a mounting assembly 12 which includes a clip 30 and an adjuster 40. Referring to FIG. 4, clip 30 and adjuster 40 are secured about grooved sleeve 20 so that longitudinal movement of sleeve 20 with respect to mounting assembly 12 does not occur. Adjuster 40 includes a mounting opening 46 (FIGS. 2 and 4) for passing a screw 47 to secure mounting assembly 12 to support member 15.

Sleeve 20 is molded on or attached to helical casing 17 and has a generally cylindrical exterior shape. A plurality of longitudinally spaced grooves 21 extend circumferentially around sleeve 20 to act in cooperation with similar grooves 37 in clip 30 to prevent relative longitudinal motion between sleeve 20 and mounting assembly 12. Sleeve 20 has an axial length sufficient to provide the desired amount of longitudinal adjustment and can be, for example, about 2 inches long. Sleeve 20 includes integral, ring like end portions 22 which have a larger circumference than grooves 21 and prevent fastening of mounting assembly 12 on end portions 22 so that the entire width of mounting assembly 12 is adjacent grooves 21 thereby improving longitudinal stability.

Clip 30 includes an upper portion 36 which has a concave, generally semicircular, lower surface 35 for abutting sleeve 20 (FIG. 4). A leg 31 extends down from upper portion 36 and also extends along a portion of the side of sleeve 20. Clip 30 includes ridges or grooves 37 which mate with grooves 21 of sleeve 20. Grooves 37 extend along concave lower surface 35 and the inside of leg 31. The outside portion of leg 31 has a ratchet like protrusion 32 with a gradually sloped ramp 33 facing the extremity of the leg and a steeply sloped ramp 34 facing toward upper portion 36, ramps 33 and 34 being joined at a common apex.

Referring to FIGS. 1 through 3, adjuster 40 includes a generally U-shaped portion with a pair of spaced legs 43 and 44 and a mounting leg 48 extending down from leg 43. The U-shaped portion is designed to abut a portion of the exterior of sleeve 20 and to extend sufficiently beyond sleeve 20 so that clip 30 can be secured between legs 43 and 44. The spacing between legs 43 and 44 is such that clip 30 snuggly fits therebetween leg 44 includes a flexible finger 41 defined by a pair of parallel slots 49 extending from the open end of the U-shaped toward the base of the U-shape. (FIGS. 1 and 3). Extending longitudinally within a portion of flexible finger 41 is a slot 42 for receiving protrusion 32 of clip 30. That is, as clip 30 is inserted between legs 43 and 44 of adjuster 40, gradually sloped ramp 33 flexes finger 41 forward and then extends through slot 42. Continued insertion of clip 30 into adjuster 40 lets protrusion 32 pass completely through slot 42 and locks clip 30 into adjuster 40. Steeply sloped ramp 34 abuts a portion of flexible finger 41 and resists withdrawal of clip 30 from adjuster 40. To remove clip 30 from adjuster 40, flexible finger 41 must be bent to clear protrusion 32.

Adjuster 40 also includes an alignment post 45 extending outwardly from leg 43 for engaging a mating alignment opening 18 in support member 15. Thus, the single connection by a screw 47 of adjuster 40 to support member 15 secures mounting assembly 12 and prevents rotation in cooperation with alignment post 45 (FIG. 2). Adjuster 40 includes a recess 51 for receiving therebetween leg 31 of clip 30 on the inner surface of leg 44. Thus, leg 31 acts together with recess 51 to prevent lateral movement between clip 30 and adjuster 40.

Referring to FIG. 3, grooved sleeve 20 extends over a nylon cover over a helical casing 17 which includes a teflon tube 55 for passing spring steel wire 16. Axially abutting helical casing 17 and teflon tube 55 is a plastic conduit 23 made of a flexible and low friction material such as hytrel. Thus, grooved sleeve 20 extends over both plastic conduit 23 and helical casing 17 and provides a means of joining the two together to form a connected piece. The use of plastic conduit 23 is particularly advantageous to provide low friction movement of spring steel wire 16 around relatively sharp corners.

Grooves or serrations 21 are advantageously sufficiently close together so that a very fine longitudinal adjustment of Bowden cable 14 can be made. For example, a longitudinal adjustment such as 1/4000ths of an inch would be desirable to insure a smoothly operating and accurate speed control system for an automobile. It is advantageous to have clip 30 and adjuster 40 laterally mate around sleeve 20 instead of, for example, being threaded on sleeve 20 so that both ends of Bowden cable 14 can be attached before it is necessary to secure Bowden cable 14 by means of mounting assembly 12.

Figure 6:
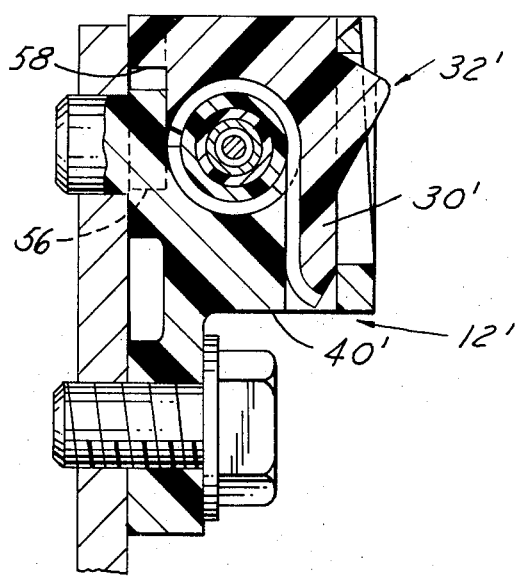
FIG. 6 is a section view similar to FIG. 2 of the connector assembly embodiment shown in FIG. 5.
Figure 7:
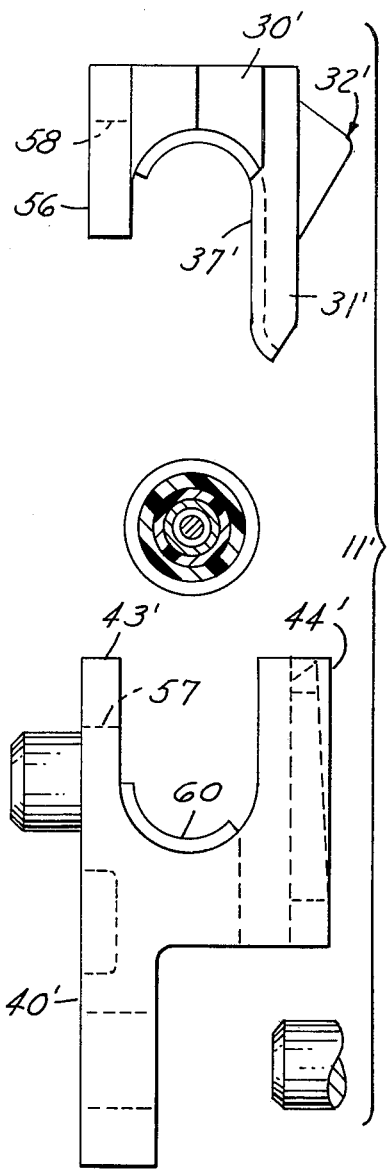
FIG. 7 is an exploded, partly section, view similar to FIG. 4 of the connector assembly embodiment shown in FIG. 5.
Figure 5:
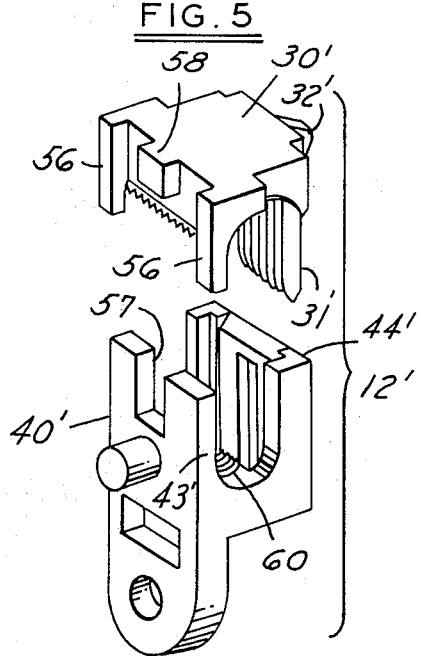
FIG. 5 is an exploded view of a connector assembly in accordance with another embodiment of this invention.

In another embodiment shown in FIGS. 5, 6 and 7, a mounting assembly 12′ of a connector assembly 11′ includes a clip 30′ and an adjuster 40′. Corresponding parts have the same numbers with the addition of a prime (′). Clip 30′ has a pair of end rails 56 which abut either side of adjuster 40′ on the opposite side from a leg 31′. Adjuster 40′ has extending therein a central slot 57 for receiving a central key 58 which extends from clip 30′ between end rails 56. The combination of end rails 56, central slot 57 and key 58 produce added resistance to lateral movement between clip 30′ and adjuster 40′. Not only is there resistance to lateral movement provided by a leg 44′ and a protrusion 32′, but also by interference between leg 43′ and end rails 56 and key 58. Also reducing lateral movement are grooves 60 (FIGS. 5 and 7) positioned in the U-shaped portion of adjuster 40′ between legs 43′ and 44′. Thus, in connector assembly 11, grooves 60 and 37′ both engage grooves 21 of sleeve 20.

In assembly, adjuster 40 is attached to support member 15 by screw 47. Sleeve 20 is fitted at the desired longitudinal position with respect to adjuster 40. While sleeve 20 is in this desired position, clip 30 is pressed down over sleeve 20 so that grooves 21 engage grooves 37 and protrusion 32 is locked into slot 42. In this simple operation Bowden cable 14 has both been secured and longitudinally positioned for proper operation of an automobile speed control.

Typical dimensions for speed control connector assembly 11 include for leg 43 a length of about 1 inch, and a width of about ¾ inch; for mounting leg 48 is about a length and width of about ¾ inch; for slot 42 a length of about ¾ inch and a width of about ⅛ inch. Similarly, the width of protrusion 32 is about ⅛ inch, the length of gradual ramp 33 is about ¼ inch and the length of steep ramp 34 is about ⅛ inch. Advantageously, sleeve 20 is molded in place on Bowden cable 14, and clip 30 and adjuster 40 are separately molded. A typical material for a sleeve, 20, clip 30 and adjuster 40 is nylon with glass fiber reinforcement.

Various modifications and variations will no doubt occur to those skilled in the various arts to which this invention pertains. For example, a particular exterior shape of the mounting assembly 12 may vary from that disclosed herein. Similarly, the connection between adjuster 40 and support member 15 may vary from that disclosed herein. Steeply sloped ramp 34 can advantageously be generally perpendicular to the outside portion of leg 31. These and all other variations which basically rely on the teachings through which this disclosure has advanced the art are properly considered within the scope of this invention.

I claim:

1. A Bowden cable and an adjustable connector assembly for securing and positioning a Bowden cable with respect to a support member, said adjustable connector assembly including:

a grooved sleeve means attached to said Bowden cable, said grooved sleeve means being generally elongated along the axis of said Bowden cable and having circumferential grooves spaced along the Bowden cable axis;

a mounting assembly means for attaching said grooved sleeve means to the support member, said mounting assembly means including a clip means and an adjuster means for securing therebetween said grooved sleeve means;

said clip means and said adjuster means being adapted to mate laterally to said sleeve means and including a first connector means and a second connector means, respectively, for releasably attaching said clip means to said adjuster means sufficiently snugly so as to securely, longitudinally position said mounting assembly means with respect to said grooved fitting;

said first connector means having an inclined, ratchet like protrusion and said second connector means having a slotted, flexible finger for receiving said protrusion;

said clip means including ridges for mating with said grooves thereby providing a means to secure the longitudinal position of said mounting assembly means and said sleeve means;

said adjuster means including an opening for passing a securing member, such as a screw, for attaching said adjuster means to the support member; and said first connector means including a concave arc portion with said ridges positioned thereon to mate with the grooved exterior surface of said sleeve means, and a first leg extending down from an end of said concave portion, an interior surface of said first leg including said ridges and an exterior surface of said first leg including said protrusion.

2. An adjustable connector assembly as recited in claim 1 wherein said adjuster means has a second leg and a third leg, said second and third legs being spaced from one another and generally parallel to each other for receiving therebetween said clip means and said third leg including said flexible finger.

3. An adjustable connector assembly as recited in claim 2 wherein said protrusion has a first and a second ramp extending from a common apex, said first ramp rising more gradually than said second ramp so that said first ramp can raise said flexible finger to allow entry of said protrusion into said slot and said second ramp can engage said finger to resist removal of said protrusion from said slot.

4. An adjustable connector assembly as recited in claim 3 wherein said sleeve means includes a pair of circular, integral, generally ring like end portions to restrict the positioning of said clip means and adjuster means to positions between said end portions and abutting said grooves.

5. An adjustable connector assembly as recited in claim 4 wherein said Bowden cable includes a helical casing of wire around a central control spring steel wire and further includes a plastic conduit axially abutting said helical casing;

a joint between said plastic conduit and said helical casing being positioned within said grooved sleeve means so that said grooved sleeve means provides a connection between said plastic conduit and said helical casing and said plastic conduit is particularly adapted for easily providing movement of said spring steel wire around angled bends.

6. An adjustable connector assembly as recited in claim 5 wherein said plastic conduit is made of hytrel.

7. An adjustable connector assembly as recited in claim 5 wherein said clip means includes a pair of spaced end rails for positioning therebetween the sides of a leg of said adjuster means thereby improving lateral stability of said clip means with respect to said adjuster means.

8. An adjustable connector assembly as recited in claim 7 wherein said adjuster means includes a central slot extending therein generally parallel to the direction of mating movement between said clip and adjuster means, said clip means having a central key protruding therefrom, said key being adapted to fit within said central slot thereby providing further lateral stability to inhibit lateral movement between said clip means and said adjuster means.

9. An adjustable connector assembly as recited in claim 8 wherein both said clip means and said adjuster means include ridges for mating with said grooves thereby securing the longitudinal position of said mounting assembly means and said sleeve means.

* * * * *